(12) United States Patent
Kurz

(10) Patent No.: US 12,536,737 B1
(45) Date of Patent: Jan. 27, 2026

(54) DYNAMIC FRAME SELECTION FOR SCENE UNDERSTANDING

(71) Applicant: Apple Inc., Cupertino, CA (US)

(72) Inventor: Daniel Kurz, Boulder, CO (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 18/135,449

(22) Filed: Apr. 17, 2023

Related U.S. Application Data

(60) Provisional application No. 63/333,252, filed on Apr. 21, 2022.

(51) Int. Cl.
| | | |
|---|---|---|
| *G06T 17/00* | (2006.01) | |
| *G06F 3/01* | (2006.01) | |
| *G06T 7/20* | (2017.01) | |

(52) U.S. Cl.
CPC ............. *G06T 17/00* (2013.01); *G06F 3/011* (2013.01); *G06T 7/20* (2013.01); *G06T 2207/10028* (2013.01)

(58) Field of Classification Search
CPC . G06T 17/00; G06T 7/20; G06T 2207/10028; G06F 3/011
See application file for complete search history.

(56) References Cited

U.S. PATENT DOCUMENTS

| | | | |
|---|---|---|---|
| 2015/0022698 A1* | 1/2015 | Na ........................ | H04N 23/635 |
| | | | 348/241 |
| 2016/0241836 A1* | 8/2016 | Cole ....................... | H04N 19/44 |
| 2017/0083748 A1* | 3/2017 | Zhou ..................... | G06F 18/211 |
| 2021/0058547 A1* | 2/2021 | Puttamalla ............. | H04N 23/60 |
| 2021/0216778 A1 | 7/2021 | Ramaswamy et al. | |
| 2021/0243362 A1* | 8/2021 | Castillo ................ | H04N 23/635 |
| 2021/0248829 A1* | 8/2021 | Steinbrücker ......... | G06T 19/006 |
| 2021/0264664 A1* | 8/2021 | Saracchini ............ | H04N 23/64 |
| 2021/0400185 A1 | 12/2021 | Price et al. | |

OTHER PUBLICATIONS

Zhang, Ziang, Liao, Wei; Yu, Lei; Yang, Wen, Xia, and Gui-Song;"Event-based Synthetic Aperture Imaging with a Hybrid Network"; CVPR 2021; pp. 14235-14244.

* cited by examiner

*Primary Examiner* — Terrell M Robinson
(74) *Attorney, Agent, or Firm* — Thompson Hine LLP

(57) ABSTRACT

Various implementations disclosed herein include devices, systems, and methods that dynamically selects particular frames of image data for generating three-dimensional (3D) representations of a physical environment. For example, an example process may include acquiring frames of image data from one or more sensors in a physical environment. The process may include determining one or more deterrent properties associated with the frames of image data. The process may include selecting a subset of the frames of image data by determining that at least one of the determined deterrent properties satisfies at least one condition of one or more conditions. The process may include determining a scene understanding of the physical environment based on the selected subset of the frames. The scene understanding may determine geometric properties of the physical environment.

21 Claims, 4 Drawing Sheets

DYNAMIC FRAME SELECTION FOR SCENE UNDERSTANDING

CROSS-REFERENCE TO RELATED APPLICATIONS

This application claims the benefit of U.S. Provisional Application Ser. No. 63/333,252 filed Apr. 21, 2022, which is incorporated herein in its entirety.

TECHNICAL FIELD

The present disclosure generally relates to adjusting operating modes, and in particular, to systems, methods, and devices that dynamically select frames of image data for generating three-dimensional (3D) representations.

BACKGROUND

Various techniques are used to generate and present three-dimensional (3D) representations of a physical environment using an electronic device. However, scanning a scene of the physical environment for 3D reconstruction is computationally expensive. The scan is often performed at a high frequency (e.g., high camera frame rates) so that the electronic device can recreate the scene accurately. Moreover, running the scan at a low frequency (e.g., fixed-cadence low camera frame rates) results in low quality 3D reconstruction due to the lower number of frames used and the generally high ratio of frames being poorly suited for scene understanding algorithms because of one or more deterrent properties (e.g., a measure of difficulty of viewing a physical environment), such as partial occlusions, motion artifacts (e.g., blurring), luminance (e.g., under/over exposure), and the like.

SUMMARY

Various implementations disclosed herein include devices, systems, and methods that selectively analyze image frames to be used for scene understanding algorithms (e.g., using 1 frame per second (FPS) of a 90 FPS frame rate). Running scene understanding algorithms at high camera frame rates is prohibitively expensive while running them at fixed-cadence low camera frame rates results in poor predictions due to the lower number of frames used and the generally high ratio of frames being poorly suited for scene understanding algorithms because of one or more deterrent properties (e.g., a measure of difficulty of viewing a physical environment), such as partial occlusions, motion artifacts/blur, or luminance (under/over exposure) and the like. The best frames are selected by running other algorithms (e.g., hand/body tracking, visual inertial odometry (VIO) processes, image signal processor (ISP) analysis, and the like) at a high frame rate, estimating based on the predictions of the other algorithms which frames are suitable for scene understanding (because they do not have deterrent properties such as partial occlusions, motion blur, or luminance issues) and selecting the most suitable frames for scene understanding algorithms at a low frame rate based on the estimation. In some implementations, interpolation may be used to skip some segments of images if those segments are too blurry (e.g., user moves head too quickly for a portion of time).

In general, one innovative aspect of the subject matter described in this specification can be embodied in methods that include the actions of, at an electronic device having a processor and one or more sensors, acquiring frames of image data from the one or more sensors in a physical environment, determining one or more deterrent properties associated with the frames of image data, selecting a subset of the frames of image data by determining that at least one of the determined deterrent properties satisfies at least one condition of one or more conditions, and determining a scene understanding of the physical environment based on the selected subset of the frames, where the scene understanding determines geometric properties of the physical environment.

These and other embodiments can each optionally include one or more of the following features.

In some aspects, determining the one or more deterrent properties associated with the frames of image data includes determining a semantic understanding of the image data.

In some aspects, determining the one or more deterrent properties associated with the frames of image data includes determining image statistics of the image data.

In some aspects, determining the one or more deterrent properties associated with the frames of image data includes detecting a hand or a body of a user of the electronic device for each frame while acquiring the frames of image data.

In some aspects, determining the one or more deterrent properties associated with the frames of image data includes tracking hand or body movements of a user of the electronic device while acquiring the frames of image data.

In some aspects, determining the one or more deterrent properties associated with the frames of image data includes determining motion of the electronic device based on motion data.

In some aspects, determining the one or more deterrent properties associated with the frames of image data includes determining motion of the electronic device using sequential frames of the image data to estimate a distance traveled.

In some aspects, determining that at least one of the determined deterrent properties satisfies at least one condition of the one or more conditions includes determining that the subset of the frames of image data includes images that include occluded pixels of one or more objects of the physical environment that satisfies an occlusion threshold requirement.

In some aspects, determining that at least one of the determined deterrent properties satisfies at least one condition of the one or more conditions includes determining that the subset of the frames of image data includes images that were acquired while the electronic device was moving less than a movement threshold.

In some aspects, determining that at least one of the determined deterrent properties satisfies at least one condition of the one or more conditions includes determining that the subset of the frames of image data includes image data that include luminance values that satisfy a luminance threshold condition.

In some aspects, the physical environment includes one or more objects.

In some aspects, determining that at least one of the determined deterrent properties satisfies at least one condition of the one or more conditions includes detecting that a first subset of the one or more objects includes non-static objects, detecting that a second subset of the one or more objects includes static objects, the first subset is different than the second subset of the one or more objects, and determining that the subset of the frames of image data only includes image data that includes the second subset of the one or more objects.

In some aspects, determining a scene understanding includes generating a three-dimensional (3D) representation of the physical environment.

In some aspects, the sensor data includes depth data and light intensity image data obtained during a scanning process. In some aspects, the electronic device is a head-mounted device (HMD).

In accordance with some implementations, a device includes one or more processors, a non-transitory memory, and one or more programs. The one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
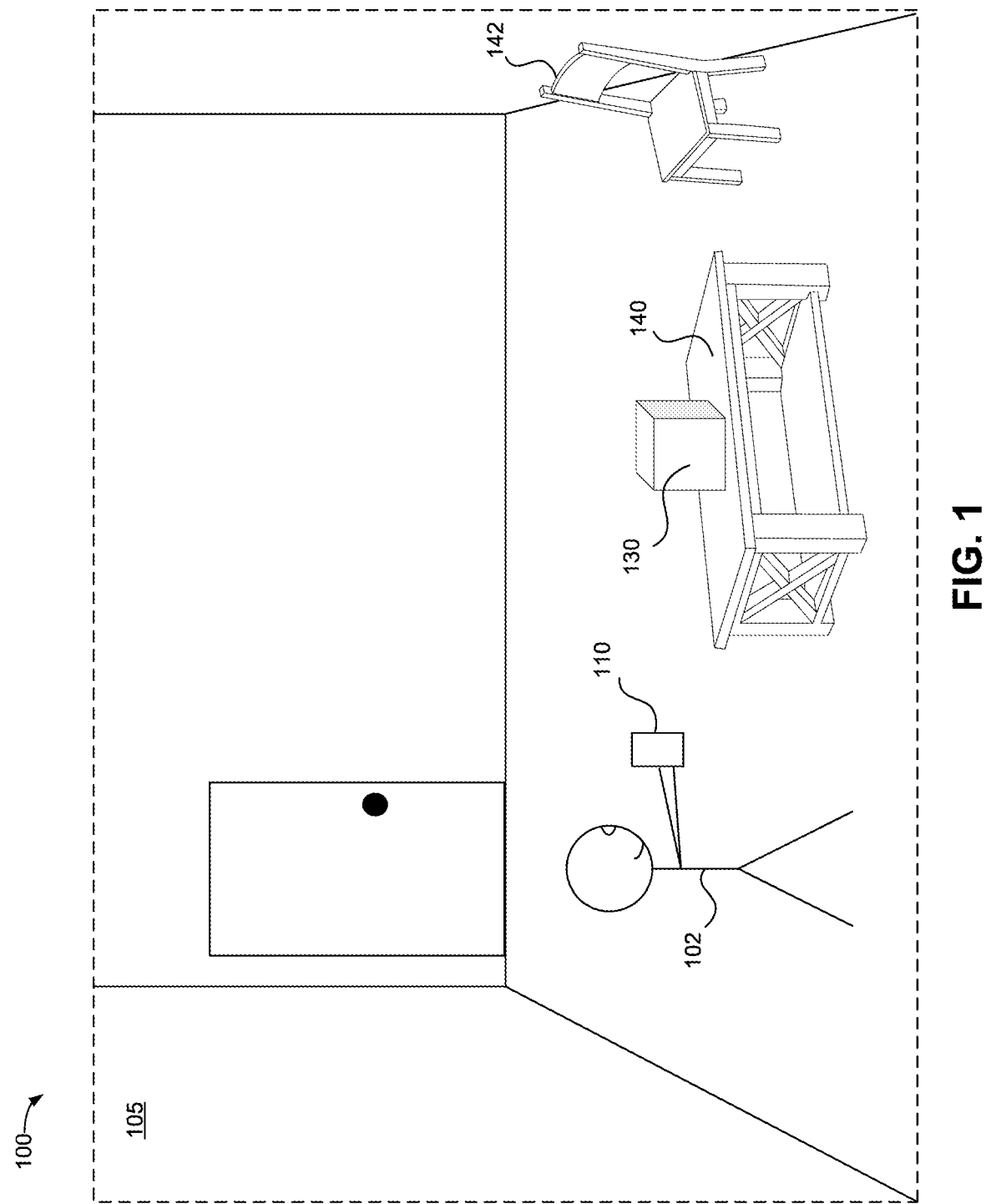
FIG. 1 is an example operating environment of a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a simplified diagram of an example operating environment 100 in accordance with some implementations. In this example, the example operating environment 100 illustrates an example physical environment 105 that includes an object 130, a table 140, and a chair 142. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head (e.g., a head-mounted device (HMD)). As such, the device 110 may include one or more displays provided to display content. The device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

Figure 2:
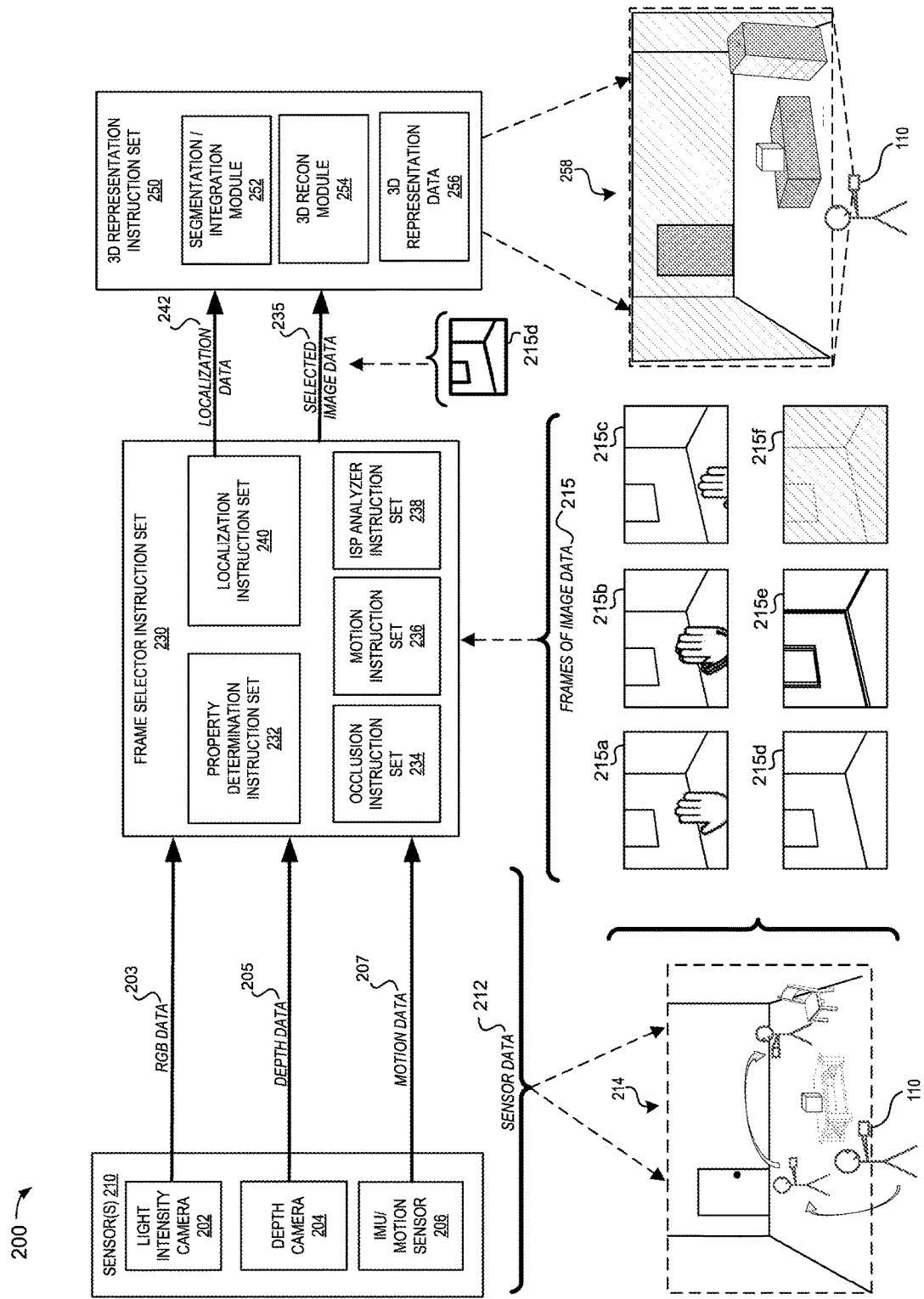
FIG. 2 is a system flow diagram of an example generation of three-dimensional (3D) representation data of the physical environment of FIG. 1 based on selected frames of image data acquired by the device according to some implementations.

FIG. 2 is a system flow diagram of an example environment 200 for determining a scene understanding of a physical environment based on a dynamic selection of image data in accordance with some implementations. In some implementations, the system flow of the example environment 200 is performed on a device (e.g., device 110 of FIG. 1), such as a mobile device, desktop, laptop, or server device. In some implementations, the system flow of the example environment 200 is performed on processing logic, including hardware, firmware, software, or a combination thereof. In some implementations, the system flow of the example environment 200 is performed on a processor executing code stored in a non-transitory computer-readable medium (e.g., a memory).

The system flow of the example environment 200 acquires, utilizing a plurality of sensor(s) 210, light intensity image data 203 (e.g., live camera feed such as RGB from light intensity camera 202), depth image data 205 (e.g., depth image data from depth camera 204), motion data 207 (e.g., motion trajectory data from motion sensor(s) 206) of a physical environment (e.g., the physical environment 105 of FIG. 1), acquires positioning information (e.g., a VIO (visual inertial odometry) module is a software module that performs VIO based on the light intensity image data 203 and motion data 207), assesses the depth data 205 and motion data 207 to determine localization data 242 of the device (e.g., the localization instruction set 240), dynamically selects portions of the image data (e.g., selected image data 235), and generates 3D representation data 256 (e.g., a scene understanding) from the selected sensor data (e.g., light intensity image data, depth data, and the like) and from the localization data 242 (e.g., via the 3D representation instruction set 250). In some implementations, other sources of physical environment information can be acquired (e.g., camera positioning information such as position and orientation data from position sensors) as opposed to using a VIO system.

In an example implementation, the environment 200 includes an image composition pipeline that acquires or obtains data (e.g., image data from image source(s), motion data, etc.) for the physical environment. Example environment 200 is an example of acquiring image sensor data (e.g., light intensity data, depth data, and motion data) for a plurality of image frames (e.g., image frames 215a-215f, also collectively referred to herein as image frames 215) at a particular frame rate (e.g., 90 Hz). For example, as illustrated in example environment 214, a user (e.g., user 102) is walking around a room acquiring sensor data from sensor(s) 210. The image source(s) may include a light intensity camera 202 (e.g., RGB camera) that acquires light intensity image data 203 (e.g., a sequence of RGB image frames), a depth camera 204 that acquires depth data 205, and a motion sensor 206 (e.g., an inertial measurement unit (IMU)) that acquires motion data 207.

For positioning information, some implementations include a VIO system to determine equivalent odometry information using sequential camera images (e.g., light intensity image data 203) and inertial data (e.g., motion data 207) to estimate the distance traveled. Alternatively, some implementations of the present disclosure may include a simultaneous localization and mapping (SLAM) system (e.g., position sensors within the sensors 210). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 200 includes a frame selector instruction set 230 that is configured with instructions executable by a processor to obtain sensor data (e.g., depth data 205 such as a sparse data map and motion data 207 such as motion trajectory data), that may be included within the image data frames 215 and dynamically analyze and determine selected image data 235. For example, the frame selector instruction set 230 dynamically selects the highest quality image frames from the plurality of image data frames 215a-215f based on utilizing one or more techniques described herein. For example, the frame selector instruction set 230 obtains data using one or a combination of several algorithms from the occlusion instruction set 234, the motion instruction set 236, the ISP analyzer instruction set 238 and/or the localization instruction set 240 to select particular frames (e.g., selected image data 235) of image data frames 215a-215f, for example, because they do not have partial occlusions, motion blur, luminance issues, etc. Thus, the frame selector instruction set 230 may convert the frames of image data 215 that are received at a first frame rate (e.g., 90 FPS) to frames of selected image data 235 at a second frame rate (e.g., 1 FPS). For example, as illustrated in FIG. 2, the frame selector instruction set 230 selected image data frame 215d of the image data frames 215a-215f, for being the "best quality" image frame to be used by the 3D representation instruction set 250 for performing scene understanding.

In an example implementation, the frame selector instruction set 230 includes a property determination instruction set 232 that is configured with instructions executable by a processor to obtain sensor data (e.g., RGB data 203, depth data 205, etc.) and determine one or more properties associated with the images of the physical environment using one or more techniques. For example, property determination may include tracking one or more objects identified in the physical environment, such as table 140, object 130, or user 102 (e.g., a hand of user 102 as seen in image data frames 215a-215c). In some implementations, an object detection algorithm (e.g., via a machine learning algorithm such as a neural network) may be utilized to identify deterrent properties included in the image data frames 215 (e.g., whether the images contain occlusions, whether the images are under-exposed, whether the images have motion blur, etc.). For example, an object detection algorithm can use a plurality of class-specific neural networks to obtain a sequence of light intensity images from a light intensity camera (e.g., a live camera feed), obtain a semantic 3D representation (e.g., a semantic 3D point cloud) of the image data, and other sources of physical environment information (e.g., camera positioning and/or orientation information from a camera's SLAM system) to identify one or more objects in the physical environment.

In an example implementation, the frame selector instruction set 230 further includes an occlusion instruction set 234 that is configured with instructions executable by a processor to obtain sensor data (e.g., RGB data 203, depth data 205, etc.) and feature detection data from the property determination instruction set 232 and determine whether one or more image frames of a set of images (e.g., image data frames 215) contain occlusions using one or more techniques. In some implementations, an occlusion mask may be generated, for example, from color segmentation (e.g., the hands color), using real depth thresholding, using people detection, and/or using real depth data in additional sequence of images. The occlusion mask may be obtained before the user scans his or her room (e.g., physical environment 105), or may be generated using the first sequence of image frames when the dynamic selection of frames occurs. The occlusion mask may identify pixels of a first image that are associated with a depth category and/or identify whether each particular pixel is foreground data or background data. For example, an occlusion mask may be obtained using image frame 215d and select each pixel in image frame 215d as background pixels (e.g., window, walls, etc.). Then, when the occlusion mask of 215d, identifying background pixels, is compared to the image frame of, for example, 215a, the pixels that include the hand of the user would be quickly identified as including occluded image frame data, such that the frame selector instruction set 230 would determine to not use image frame 215a in the selected image data 235. Alternatively, other techniques for identifying occlusions in images may be used.

In an example implementation, the frame selector instruction set 230 further includes a motion instruction set 236 that is configured with instructions executable by a processor to obtain sensor data (e.g., RGB data 203, depth data 205, etc.) and track a location of a moving device (e.g., device 110) in a 3D coordinate system using one or more techniques. For example, the motion instruction set 236 can analyze VIO information from a VIO module (e.g., a software module that performs VIO using visual data and inertial data from a camera and an IMU), motion data 207 from the motion sensor 206, and/or RGB data 203, and determine whether one or more of the image frames 215 include a deterrent property such as motion artifacts and/or blurring (e.g., from the user moving his or her head too quickly while wearing an HMD). For example, image frame 215b and 215e would be identified as image frames that include motion artifacts (e.g., blurring) that the frame selector instruction set 230 would then dynamically exclude from the selected image data 235.

In an example implementation, the frame selector instruction set 230 further includes an ISP analyzer instruction set 238 that is configured with instructions executable by a processor to obtain sensor data (e.g., RGB data 203, depth data 205, etc.) and determines ISP statistics and estimates using one or more techniques. For example, ISP analyzer instruction set 238 may be used to analyze deterrent properties by determining signal-to-noise ratio (SNR), exposure target offset, color tint estimate, a luminance histogram based on luminance values, and the like, for one or more pixels of the image frames 215. In some embodiments, one of the sensors for device 110 may be an ambient light sensor that provides ambient light data. Ambient light sensors may not require processing of all the pixels of an entire image, but instead work with a single luminance value (e.g., a photometric measure of the luminous intensity per unit area of light traveling in a given direction) for each sensing element of the ambient light sensor. For example, the ISP analyzer instruction set 238 may determine that image frame 215f (shown with shading), includes one or more pixels that fail to meet a luminance threshold, and thus would be excluded from the selected image data 235 by the frame selector instruction set 230. In the example implementation, the ISP analyzer instruction set 238 is located within the frame selector instruction set 230 module. Alternatively, the ISP analyzer instruction set 238 is separate from the frame selector instruction set 230 module, and performs the same functionality as described herein.

In some implementations, not all sensor data may be available for each image frame 215. When some sensor data is not available, the occlusion instruction set 234, the motion instruction set 236, and/or the ISP analyzer instruction set 238 can utilize techniques such as interpolation of metrics between image frames 215a-215f in order to determine to dynamically exclude some segments of image data from the selected image data 235 and being used in a scene understanding (e.g., 3D representation/reconstruction). For example, the occlusion instruction set 234 could utilize interpolation of metrics for a ratio of pixels corresponding to non-static objects, the motion instruction set 236 could utilize interpolation of metrics for angular velocity, and ISP analyzer instruction set 238 could utilize interpolation of metrics for SNR between image frames 215a-215f in order to determine to dynamically exclude some segments of image data from the selected image data 235.

In an example implementation, the frame selector instruction set 230 further includes a localization instruction set 240 that is configured with instructions executable by a processor to obtain sensor data (e.g., RGB data 203, depth data 205, etc.) and track a location of a moving device (e.g., device 110) in a 3D coordinate system using one or more techniques. For example, the localization instruction set 240 analyzes RGB images from a light intensity camera 202 with a sparse depth map from a depth camera 204 (e.g., time-of-flight sensor), plane extraction data (e.g., plane estimation parameters), and other sources of physical environment information (e.g., camera positioning and/or orientation information from a VIO system, or a camera's SLAM system, or the like) to generate localization data 242 by tracking device location information for 3D reconstruction (e.g., a 3D model representing the physical environment of FIG. 1) or for other scene understanding algorithms. In the example implementation, the localization instruction set 240 is located within the frame selector instruction set 230 module. Alternatively, the localization instruction set 240 is separate from the frame selector instruction set 230 module, and performs the same functionality as described herein.

In an example implementation, the environment 200 further includes a 3D representation instruction set 250 that is configured with instructions executable by a processor to obtain the sensor data (e.g., RGB data 203, depth data 205, etc.) associated with the selected image data 235 from the frame selector instruction set 230 and localization data 242 from the localization instruction set 240 and generate 3D representation data 256 using one or more techniques. For example, the 3D representation instruction set 250 analyzes, for the selected image data 235, RGB images from a light intensity camera 202 with a sparse depth map from a depth camera 204 (e.g., time-of-flight sensor, passive or active stereo sensors such as a structured light depth camera, and the like), and other sources of physical environment information (e.g., camera positioning and/or orientation information such as a VIO system, or a camera's SLAM system, or the like) to generate 3D representation data 256 (e.g., a 3D model representing the physical environment of FIG. 1).

The 3D representation data 256 could be 3D representations representing the surfaces in a 3D environment using a 3D point cloud with associated semantic labels. In some implementations, the 3D representation data 256 may be stored as a volumetric representation and/or an occupancy map. The 3D representations, as illustrated in image 258, may include 3D bounding boxes for each detected object of interest, such as object 130, table 140, and chair 142. In some implementations, the 3D representation data 256 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a Poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, a voxel hashing approach may be used in which 3D space is divided into voxel blocks, referenced by a hash table using their 3D positions as keys.

In some implementations, the 3D representation instruction set 250 includes an integration instruction set (e.g., integration/segmentation module 252) that is configured with instructions executable by a processor to obtain the subset of image data (e.g., light intensity data 203, depth data 205, etc.) and positioning the information (e.g., camera pose information from a VIO system) and integrate (e.g., fuse) the subset of image data using one or more known techniques. For example, the image integration instruction set receives a subset of depth image data 205 (e.g., sparse depth data) and a subset of intensity image data 203 (e.g., RGB) from the image sources (e.g., light intensity camera 202 and depth camera 204), and integrates the subset of image data and generates 3D data. The 3D data can include a dense 3D point cloud (e.g., imperfect depth maps and camera poses for a plurality of image frames around the object) that is sent to the 3D representation instruction set 250. The 3D data can also be voxelized.

In some implementations, the 3D representation instruction set 250 includes a semantic segmentation instruction set (e.g., integration/segmentation module 252) that is configured with instructions executable by a processor to obtain a subset of the light intensity image data (e.g., light intensity data 203) and identify and segment wall structures (wall, doors, windows, etc.) and objects (e.g., person, table, teapot, chair, vase, etc.) using one or more known techniques. For example, the segmentation instruction set receives a subset of intensity image data 203 from the image sources (e.g., light intensity camera 202), and generates segmentation data (e.g., semantic segmentation data such as RGB-S data). In some implementations, a segmentation instruction set uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

In an example implementation, the environment 200 may further include additional post processing or downstream processes that utilize the 3D representation data 256. The post processing may further refine the 3D representation data or may use the data for different purposes/tasks (e.g., scene graphs, environment light estimation, body tracking, etc.).

In the example of FIGS. 1-2, the electronic device 110 is illustrated as a hand-held device. The electronic device 110 may be a mobile phone, a tablet, a laptop, so forth. In some implementations, electronic device 110 may be worn by a user. For example, electronic device 110 may be a watch, a head-mounted device (HMD), head-worn device (glasses), headphones, an ear mounted device, and so forth. In some implementations, functions of the device 110 are accomplished via two or more devices, for example a mobile device and base station or a head mounted device and an ear mounted device. Various capabilities may be distributed amongst multiple devices, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 110 may communicate with one another via wired or wireless communications and/or via an intermediary device such as a playback session server.

Figure 3:
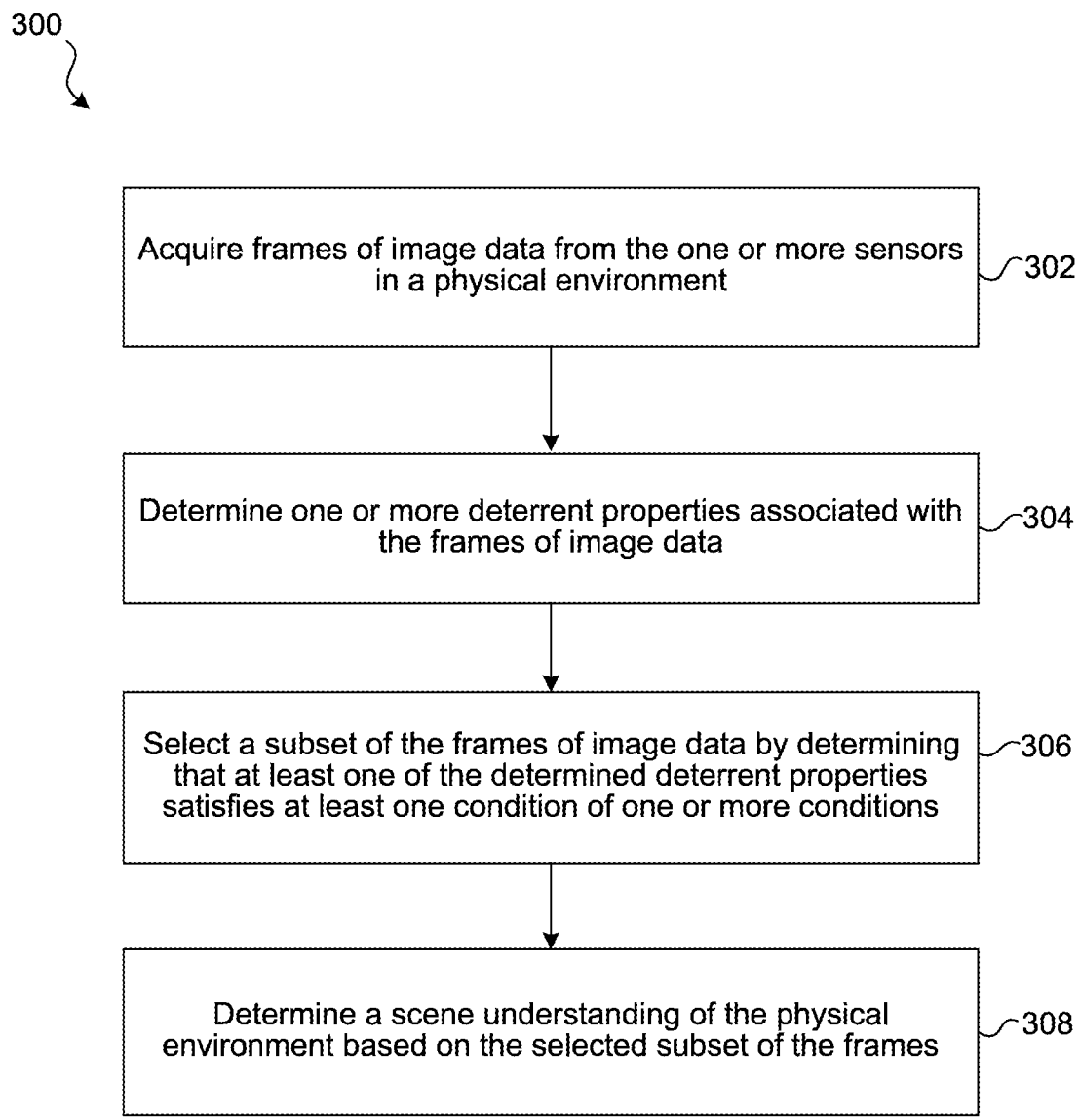
FIG. 3 is a flowchart representation of an exemplary method for generating a scene understanding of a physical environment based on a dynamically selected subset of the frames of image data in accordance with some implementations.

FIG. 3 is a flowchart representation of an exemplary method 300 that generates a scene understanding of a physical environment based on a dynamically selected subset of the frames of image data in accordance with some implementations. In some implementations, the method 300 is performed by a device (e.g., device 110 of FIG. 1), such as a mobile device, HMD, desktop, laptop, or server device. In some implementations, the method 300 is performed by processing logic, including hardware, firmware, software, or a combination thereof. In some implementations, the method 300 is performed by a processor executing one or more instruction sets stored in a non-transitory computer-readable medium (e.g., a memory).

At block 302, the method 300 acquires frames of image data from the one or more sensors in a physical environment. The sensor data may include light intensity image data (e.g., a sequence of RGB image frames). The sensor data may further include depth data acquired from a depth sensor (e.g., depth sensor data from a LIDAR sensor, time-of-flight sensor, an IR-based depth sensor, or the like). For example, a user may use sensor(s) on a device (e.g., cameras) to acquire image data of a physical environment (e.g., physical environment 105 of FIG. 1) for a room scanning application by obtaining images of the user's current room.

At block 304, the method 300 determines one or more deterrent properties associated with the frames of image data. For example, the property determination instruction set 232 determines one or more deterrent properties associated with the images of the physical environment using one or more techniques. For example, property determination may include tracking one or more objects identified in the physical environment, such as table 140, object 130, or user 102 (e.g., a hand of user 102 as seen in image data frames 215a-215c). In some implementations, an object detection algorithm (e.g., via a machine learning algorithm such as a neural network) may be utilized to identify deterrent properties included in the image data frames 215. For example, an object detection algorithm can use a plurality of class-specific neural networks to obtain a sequence of light intensity images from a light intensity camera (e.g., a live camera feed), obtain a semantic 3D representation (e.g., a semantic 3D point cloud) of the image data, and other sources of physical environment information (e.g., camera positioning and/or orientation information from a camera's SLAM system) to identify one or more objects in the physical environment.

In some implementations, determining the one or more deterrent properties associated with the frames of image data includes determining a semantic understanding of the image data. For example, a semantic understanding can be used to determine which objects are in the image, such as which parts of the image are the users' hands/body compared to which parts of the image are static vs. dynamic objects, etc. Determining a semantic understanding based on a single image can lead to information about which fraction of the image frame has static scene content vs. dynamic objects occluding the scene. In some implementations, determining a semantic understanding based on a single image can further be accomplished by additionally using information from the previous frame. For example, static and/or dynamic objects can be tracked from frame-to-frame, which adds the benefit of being able to estimate the motion/speed of dynamic objects and penalize moving dynamic objects. For example, tracking moving dynamic objects such as waving hands more than currently static dynamic objects such as resting hands.

In some implementations, determining the one or more deterrent properties associated with the frames of image data includes determining image statistics of the image data. For example, the ISP analyzer instruction set 238 may determine whether the image is under-exposed or over-exposed, whether the image is noisy (e.g., has a low SNR), whether the image includes a hue shift (e.g., auto white balance did not fully adjust the white point, such that a white surface appears white), and the like, based on ISP statistics and estimates of the image data (e.g., based on pixel intensities). In some implementations, the image statistics (e.g., ISP statistics) are stored as meta data with each frame. For example, the ISP analyzer instruction set 238 may determine one or more deterrent properties associated with the image data based on only analyzing the meta data (e.g., which may include information such as how bright or dark the image is, how noisy the image is, whether it has a color tint, etc.). For example, ISP analyzer instruction set 238 may be used to determine signal-to-noise ratio (SNR), exposure target offset, color tint estimate, a luminance histogram based on luminance values, and the like, for one or more pixels of the image frames 215.

In some embodiments, one of the sensors for device 110 may be an ambient light sensor that provides ambient light data. Ambient light sensors may not require processing of all the pixels of an entire image, but instead work with a single luminance value (e.g., a photometric measure of the luminous intensity per unit area of light traveling in a given direction or range of directions) for each sensing element of the ambient light sensor. For example, the ISP analyzer instruction set 238 may determine that image frame 215f (shown with shading), includes one or more pixels that fail to meet a luminance threshold, and thus would be excluded from the selected image data 235 by the frame selector instruction set 230.

In some implementations, determining the one or more deterrent properties associated with the frames of image data includes detecting hand or body movements of a user of the electronic device for each frame while acquiring the frames of image data. For example, the property determination instruction set 232 determines one or more deterrent properties associated with the images of the physical environment using one or more techniques. For example, hands and body of a person within each frame may be detected without using any information from previous frames (e.g., a frame-by-frame basis). In this case, the property determination instruction set 232 would not know about any previous detected movements (which are important to determine motion blur), but the property determination instruction set 232 would detect the current position of hands and arms in order to detect occlusions. For example, property determination may include detecting one or more objects identified in the physical environment, such as table 140, object 130, or user 102 (e.g., a hand of user 102 as seen in image data frames 215a-215c).

In some implementations, determining the one or more deterrent properties associated with the frames of image data includes tracking hand or body movements of a user of the electronic device while acquiring the frames of image data. For example, the property determination instruction set 232 determines one or more deterrent properties associated with the images of the physical environment for a series for frames of image data using one or more techniques. For example, property determination may include tracking one or more objects identified in the physical environment, such as table 140, object 130, or user 102 (e.g., a hand of user 102 as seen in image data frames 215a-215c). In some implementations, an object detection algorithm (e.g., via a machine learning algorithm such as a neural network) may be utilized to identify deterrent properties included in the image data frames 215. For example, an object detection algorithm can use a plurality of class-specific neural networks to obtain a sequence of light intensity images from a light intensity camera (e.g., a live camera feed), obtain a semantic 3D representation (e.g., a semantic 3D point cloud) of the image data, and other sources of physical environment information (e.g., camera positioning and/or orientation information from a camera's SLAM system) to identify one or more objects in the physical environment.

In some implementations, determining the one or more deterrent properties associated with the frames of image data includes determining motion of the electronic device based on motion data. For example, motion blur may be determined based on an estimation of change of position and/or orientation of the device based on motion data (e.g., an IMU) without looking at any images, from the time when the image was taken. Thus, motion blur may be determined without accessing any image pixel intensities at all (e.g., dead reckoning), while still determining deterrent properties associated with the image data.

In some implementations, determining the one or more deterrent properties associated with the frames of image data includes determining motion of the electronic device using sequential frames of the image data to estimate a distance traveled. For example, a VIO system, a SLAM system, and/or an IMU/motion sensor 206 may be used to identify camera motion and resulting motion blur in the frames of image data 215 (e.g., image frames 215b and 215e). In some implementations, determining motion blur may be achieved by using both information from camera images and from the IMU, e.g., as done by a VIO system.

At block 306, the method 300 selects a subset of the frames of image data by determining that at least one of the determined deterrent properties satisfies at least one condition of one or more conditions. For example, the frame selector instruction set 230 dynamically selects the highest quality image frames from the plurality of image data frames 215a-215f based on utilizing one or more techniques described herein. For example, the frame selector instruction set 230 obtains data using one or a combination of several algorithms from the occlusion instruction set 234, the motion instruction set 236, the ISP analyzer instruction set 238 and/or the localization instruction set 240 to select particular frames (e.g., selected image data 235) of image data frames 215a-215f, for example, because they do not have partial occlusions, motion blur, luminance issues, etc. Thus, the frame selector instruction set 230 may convert the frames of image data 215 that are received at a first frame rate (e.g., 90 FPS) to frames of selected image data 235 at a second frame rate (e.g., 1 FPS). For example, as illustrated in FIG. 2, the frame selector instruction set 230 selected image data frame 215d of the image data frames 215a-215f, for being the "best quality" image frame to be used by the 3D representation instruction set 250 for the scene understanding.

In some implementations, determining that at least one of the determined deterrent properties satisfies at least one condition of the one or more conditions includes determining that the subset of the frames of image data includes images that include occluded pixels of the one or more objects that satisfies an occlusion threshold requirement. For example, identifying, by the occlusion instruction set 234, particular frames to be excluded from the selected image data 235, because they have partial occlusions in x % of total pixels (e.g., greater than 5% occlusion).

In some implementations, determining that at least one of the determined deterrent properties satisfies at least one condition of the one or more conditions includes determining that the subset of the frames of image data includes images that were acquired while the electronic device was moving less than a movement threshold. For example, identifying, by the motion instruction set 236, particular frames to be excluded from the selected image data 235, because they have motion blur (e.g., image frames 215b and 215e).

In some implementations, determining that at least one of the determined deterrent properties satisfies at least one condition of the one or more conditions includes determining that the subset of the frames of image data includes image data that include luminance values that satisfy a luminance threshold condition. For example, identifying, by the ISP analyzer instruction set 238, particular frames to be excluded from the selected image data 235, because they have luminance issues, such as being under-exposed or over-exposed (e.g., image frame 215f).

In some implementations, the physical environment includes one or more objects. In some implementations, determining that at least one of the determined deterrent properties satisfies at least one condition of the one or more conditions includes detecting that a first subset of the one or more objects includes non-static objects, detecting that a second subset of the one or more objects includes static objects, the first subset is different than the second subset of the one or more objects, and determining that the subset of the frames of image data only includes image data that includes the second subset of the one or more objects. For example, using detection and/or segmentation of non-static objects such as the user's body, other people, pets/animals, and the like, in order to dynamically select the selected image data 235.

At block 308, the method 300 determines a scene understanding of the physical environment based on the selected subset of the frames, where the scene understanding determines geometric properties of the physical environment. In some implementations, the scene understanding identifies one or more objects (e.g., this object is a couch) and/or the scene understanding determines positions of the one or more objects (e.g., here is the couch's position in the room) in the physical environment. For example, a scene understanding may be a 3D representation/reconstruction (e.g., 3D representation data 256) that is generated based on dynamically selected sensor data (e.g., selected image data 235). The dynamically selected sensor data (e.g., selected image data 235) may include selecting the most suitable frames for scene understanding algorithms at a low frame rate (e.g., 1 FPS) compared to the higher frame rate (e.g., 90 FPS) of image data that was received (e.g., frames of image data 215 received by the frame selector instruction set 230). In some implementations, interpolation may be used to skip some segments of images if too blurry (e.g., user moves head too quickly). The 3D representation may be a 3D model (e.g., a 3D mesh representation, a 3D point cloud with associated semantic labels, or the like). In some implementations, generating a 3D representation may include a computer-vision depth analysis.

In some implementations, the scene understanding is a 3D representation, such as a computer-generated reality (CGR) environment that is presented to the user. In one example, the entire experience of watching a virtual screen is within a fully immersive CGR environment while wearing an HMD. In some implementations, the graphical environment is a mixed reality (MR) experience that is presented to the user. For example, the screen is virtual and the corresponding illumination from the virtual screen is virtual, but the remaining environment is the physical environment, either from video-see-through (e.g., in which the physical environment is captured by a camera and displayed on a display with additional content) or optical-see-through (e.g., in which the physical environment is viewed directly or through glass and supplemented with displayed additional content).

In some implementations, the method 300 produces a scene graph. In some implementations, the method 300 produces scene information based on spatial, material, or object type information for the selected image data 235. For example, several input sub-processes may produce information that is used by the 3D reconstruction module 254 (e.g., world tracking module, scene attribute extraction module, metric depth module, and the like). Additionally, the output of the 3D reconstruction module 254 (e.g., 3D representation data 256) may be used by several sub-processes for post processing such an object tracking module, a motion capture module, a scene graph module, an environment light estimation module, and the like.

Figure 4:
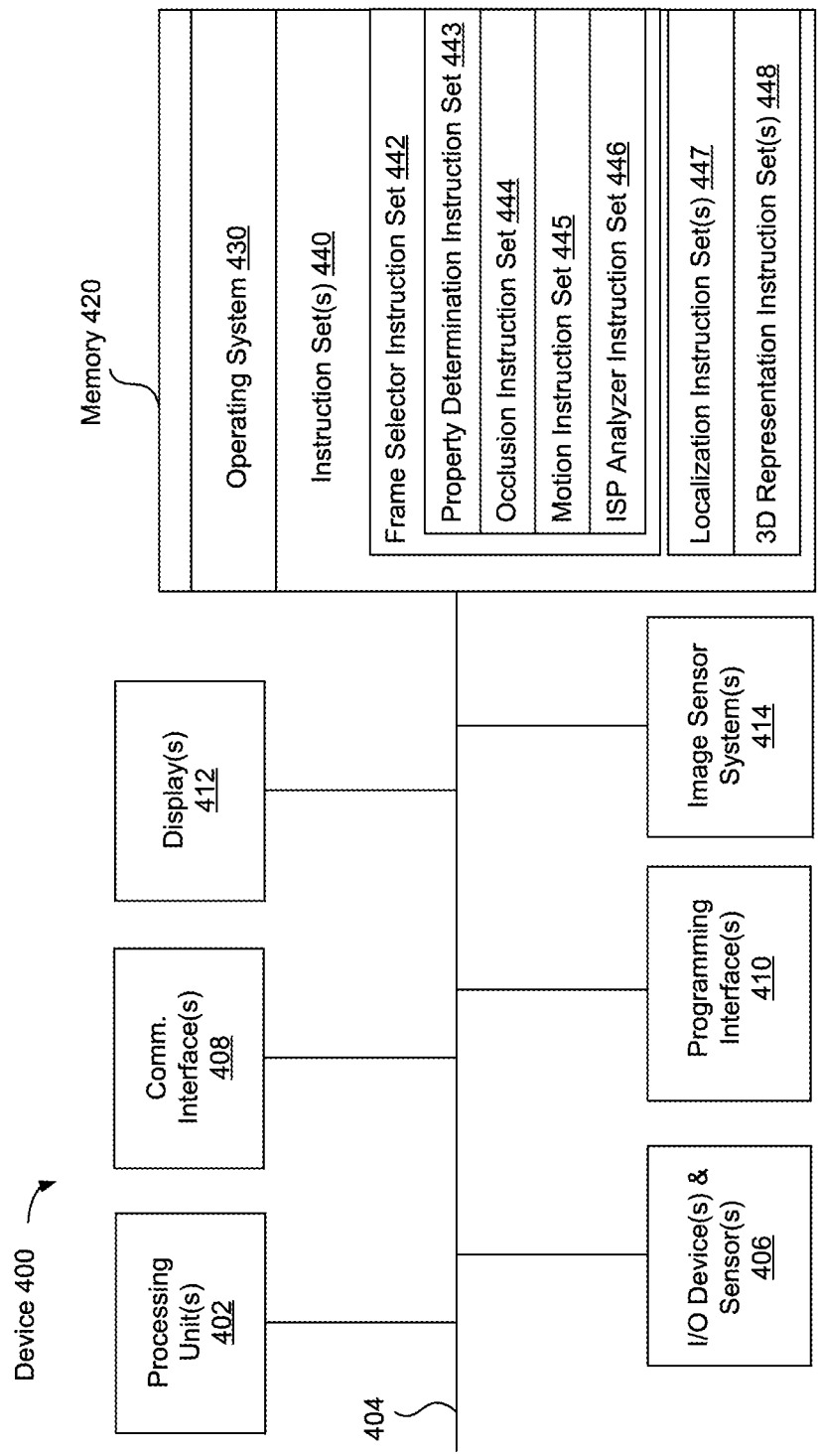
FIG. 4 is an example device in accordance with some implementations.

FIG. 4 is a block diagram of an example device 400. Device 400 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 410, one or more displays 412, one or more interior and/or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 412 are configured to present a view of a physical environment or a graphical environment to the user. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 412 correspond to diffractive, reflective, polarized, holographic, etc. waveguide displays. In one example, the device 400 includes a single display. In another example, the device 400 includes a display for each eye of the user.

In some implementations, the one or more image sensor systems 414 are configured to obtain image data that corresponds to at least a portion of the physical environment 105. For example, the one or more image sensor systems 414 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 414 further include illumination sources that emit light, such as a flash. In various implementations, the one or more image sensor systems 414 further include an on-camera image signal processor (ISP) configured to execute a plurality of processing operations on the image data.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 includes a non-transitory computer readable storage medium.

In some implementations, the memory 420 or the non-transitory computer readable storage medium of the memory 420 stores an optional operating system 430 and one or more instruction set(s) 440. The operating system 430 includes procedures for handling various basic system services and for performing hardware dependent tasks. In some implementations, the instruction set(s) 440 include executable software defined by binary information stored in the form of electrical charge. In some implementations, the instruction set(s) 440 is software that is executable by the one or more processing units 402 to carry out one or more of the techniques described herein.

The frame selector instruction set(s) 442 (e.g., frame selector instruction set 230 of FIG. 2) is executable by the processing unit(s) 402 to dynamically select image data (e.g., selected image data 235 of FIG. 2). The frame selector instruction set(s) 442 may include a property determination instruction set 443 (e.g., property determination instruction set 232), an occlusion instruction set 444 (e.g., occlusion instruction set 234), a motion instruction set 445 (e.g., motion instruction set 236), and/or an ISP analyzer instruction set 446 (e.g., ISP analyzer instruction set 238). The instruction set(s) 440 may be embodied as a single software executable or multiple software executables.

The localization instruction set 447 (e.g., localization instruction set 240 of FIG. 2) is executable by the processing unit(s) 402 to generate localization data (e.g., localization data 242 of FIG. 2).

The 3D representation instruction set 448 (e.g., 3D representation instruction set 250 of FIG. 2) is executable by the processing unit(s) 402 to generate 3D representation data (e.g., 3D representation data 256 of FIG. 2). For example, the 3D representation instruction set 448 obtains sensor data (e.g., sensor data 212 of a physical environment such as the physical environment 105 of FIG. 1) and generates 3D representation data (e.g., a 3D mesh representation, a 3D point cloud with associated semantic labels, or the like) using techniques described herein.

Although the instruction set(s) 440 are shown as residing on a single device, it should be understood that in other implementations, any combination of the elements may be located in separate computing devices. Moreover, FIG. 4 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor and one or more sensors:
   acquiring frames of image data from the one or more sensors in a physical environment;
   determining one or more deterrent properties associated with the frames of image data by a first technique based on a first set of criteria;
   selecting a subset of the frames of image data for a second technique based on a second set of criteria by determining that at least one of the determined deterrent properties satisfies at least one condition of one or more conditions associated with the first technique, wherein the second set of criteria is different than the first set of criteria; and
   determining three-dimensional (3D) representation data associated with the physical environment based on the selected subset of the frames.

2. The method of claim 1, wherein determining the one or more deterrent properties associated with the frames of image data by the first technique based on the first set of criteria comprises determining a semantic understanding of the image data.

3. The method of claim 1, wherein determining the one or more deterrent properties associated with the frames of image data by the first technique based on the first set of criteria comprises determining image statistics of the image data.

4. The method of claim 1, wherein determining the one or more deterrent properties associated with the frames of image data by the first technique based on the first set of criteria comprises detecting a hand or a body of a user of the electronic device for each frame while acquiring the frames of image data.

5. The method of claim 1, wherein determining the one or more deterrent properties associated with the frames of image data by the first technique based on the first set of criteria comprises tracking hand or body movements of a user of the electronic device while acquiring the frames of image data.

6. The method of claim 1, wherein determining the one or more deterrent properties associated with the frames of image data by the first technique based on the first set of criteria comprises determining motion of the electronic device based on motion data.

7. The method of claim 1, wherein determining the one or more deterrent properties associated with the frames of image data by the first technique based on the first set of criteria comprises determining motion of the electronic device using sequential frames of the image data to estimate a distance traveled.

8. The method of claim 1, wherein determining that at least one of the determined deterrent properties satisfies at least one condition of the one or more conditions comprises determining that the subset of the frames of image data for the second technique includes images that comprise occluded pixels of one or more objects of the physical environment that satisfies an occlusion threshold requirement.

9. The method of claim 1, wherein determining that at least one of the determined deterrent properties satisfies at least one condition of the one or more conditions comprises determining that the subset of the frames of image data for the second technique includes images that were acquired while the electronic device was moving less than a movement threshold.

10. The method of claim 1, wherein determining that at least one of the determined deterrent properties satisfies at least one condition of the one or more conditions comprises determining that the subset of the frames of image data for the second technique includes image data that comprise luminance values that satisfy a luminance threshold condition.

11. The method of claim 1, wherein the physical environment comprises one or more objects.

12. The method of claim 11, wherein determining that at least one of the determined deterrent properties satisfies at least one condition of the one or more conditions associated with the first technique comprises:
   detecting that a first subset of the one or more objects comprises non-static objects;
   detecting that a second subset of the one or more objects comprises static objects, the first subset is different than the second subset of the one or more objects; and
   determining that the subset of the frames of image data only includes image data that comprises the second subset of the one or more objects.

13. The method of claim 1, wherein the second technique comprises determining a scene understanding associated with the physical environment.

14. The method of claim 1, wherein the image data comprises depth data and light intensity image data obtained during a scanning process.

15. The method of claim 1, wherein the electronic device is a head-mounted device (HMD).

16. The method of claim 1, wherein the first set of criteria is associated with a first frame rate that is different than a second frame rate associated with the second set of criteria.

17. A system comprising:
- a non-transitory computer-readable storage medium; and
- one or more processors coupled to the non-transitory computer-readable storage medium, wherein the non-transitory computer-readable storage medium comprises program instructions that, when executed on the one or more processors, cause the one or more processors to perform operations comprising:
  - acquiring frames of image data from one or more sensors of an electronic device in a physical environment;
  - determining one or more deterrent properties associated with the frames of image data by a first technique based on a first set of criteria;
  - selecting a subset of the frames of image data for a second technique based on a second set of criteria by determining that at least one of the determined deterrent properties satisfies at least one condition of one or more conditions associated with the first technique, wherein the second set of criteria is different than the first set of criteria; and
  - determining three-dimensional (3D) representation data associated with the physical environment based on the selected subset of the frames.

18. The system of claim 17, wherein determining the one or more deterrent properties associated with the frames of image data by the first technique based on the first set of criteria comprises determining a semantic understanding of the image data.

19. The system of claim 17, wherein determining the one or more deterrent properties associated with the frames of image data by the first technique based on the first set of criteria comprises determining image statistics of the image data.

20. The system of claim 17, wherein determining the one or more deterrent properties associated with the frames of image data by the first technique based on the first set of criteria comprises detecting a hand or a body of a user of the electronic device for each frame while acquiring the frames of image data.

21. A non-transitory computer-readable storage medium storing program instructions executable via one or more processors to perform operations comprising:
- acquiring frames of image data from one or more sensors of an electronic device in a physical environment;
- determining one or more deterrent properties associated with the frames of image data by a first technique based on a first set of criteria;
- selecting a subset of the frames of image data for a second technique based on a second set of criteria by determining that at least one of the determined deterrent properties satisfies at least one condition of one or more conditions associated with the first technique, wherein the second set of criteria is different than the first set of criteria; and
- determining three-dimensional (3D) representation data associated with the physical environment based on the selected subset of the frames.

* * * * *